United States Patent [19]

Cohen

[11] Patent Number: 4,696,983
[45] Date of Patent: Sep. 29, 1987

[54] POLYMERIZATION REACTOR COATINGS AND USE THEREOF

[75] Inventor: Louis Cohen, Avon Lake, Ohio

[73] Assignee: The B. F. Goodrich Company, Akron, Ohio

[21] Appl. No.: 776,283

[22] Filed: Sep. 16, 1985

[51] Int. Cl.$^4$ .......................... C08F 2/16; C08F 2/18; C08F 2/22; C08F 20/06

[52] U.S. Cl. .................................... 526/62; 526/74; 526/240; 526/311; 526/344; 526/344.2; 526/918; 427/230; 428/461; 252/DIG. 1; 528/484

[58] Field of Search .............. 526/62, 74, 344.2, 311, 526/240, 918, 344; 422/131; 428/461; 427/230; 252/DIG. 1; 528/484

[56] References Cited

U.S. PATENT DOCUMENTS

| | | | |
|---|---|---|---|
| 3,775,126 | 11/1973 | Babbitt et al. | 106/125 X |
| 4,049,894 | 9/1977 | Backderf | 526/62 |
| 4,098,972 | 7/1978 | Ogawa et al. | 526/62 |
| 4,240,921 | 12/1980 | Kaniecki | 252/DIG. 1 X |
| 4,344,993 | 8/1982 | Schmidt et al. | 526/62 X |
| 4,375,533 | 3/1983 | Park et al. | 526/74 X |
| 4,387,182 | 6/1983 | Friedli et al. | 526/62 X |
| 4,579,758 | 4/1986 | Dorsch et al. | 526/62 X |

FOREIGN PATENT DOCUMENTS

| | | | |
|---|---|---|---|
| 3023964 | 1/1982 | Fed. Rep. of Germany | 526/62 |
| 0011504 | 1/1983 | Japan | 526/62 |
| 0004602 | 1/1984 | Japan | 526/62 |

Primary Examiner—Joseph L. Schofer
Assistant Examiner—F. M. Teskin
Attorney, Agent, or Firm—J. Hughes Powell; Alan A. Csontos

[57] ABSTRACT

Compositions of salts of water-soluble, carboxyl-containing polymers and surface active agents, deposited on polymerization reactor surfaces exposed to polymerization mixtures, substantially reduce or eliminate undesirable polymer build-up on reactor surfaces during aqueous polymerization of vinylidene monomers, even when the amount of carboxyl-containing polymers deposited on the reactor surfaces is very small.

29 Claims, No Drawings

POLYMERIZATION REACTOR COATINGS AND USE THEREOF

BACKGROUND OF THE INVENTION

The polymerization of unsaturated monomers commercially is normally conducted in large vessels or reactors which are frequently provided with auxiliary equipment, such as baffles, heat transfer coils, instrument wells, stirring or mixing means, and the like. Vinyl chloride, for example, when polymerized either alone or with other vinylidene comonomers, is normally polymerized in water in the presence of suspending, dispersing or emulsifying agents and free radical forming catalysts in pressure polymerization reactors. In such polymerizations, in both the suspension and emulsion systems, polymer is usually deposited on surfaces of the polymerization reactor walls, baffles, agitator and other exposed surfaces. This polymer build-up normally begins as a thin layer, often referred to as paper build-up, which, with successive charges, becomes increasingly heavy, of a sandy and often hard nature. These undesirable polymer deposits on the surfaces of the equipment with which the reaction mixtures come into contact interfere with the efficient heat transfer. Further, these deposits have a tendency to deteriorate. The deposits often break off of the surfaces, resulting in contamination of the reaction mixture and the products produced therefrom.

It is very often necessary, after each polymerization reaction is completed, to open the reactor amd scrape the polymer build-up off the walls, baffles and agitator, etc. An operation such as this is costly, both in labor and down-time of the reactor, i.e., lost production. In order to reduce polymer build-up, it has been proposed to coat the interior surfaces of the polymerization vessels with various materials prior to the start of the reaction. As examples of some of these coating materials, reference is made to U.S. Pat. Nos. 4,024,330, polyaromatic amines in organic solvents; 4,024,301, polyaromatic amines in aqueous alkali; 4,255,470, polyaromatic amines in HCl solution; 4,080,173, self-condensed polyhydric phenols in aqueous alkali; 4,228,130, polyhydric phenol-sodium hypochlorite reaction products; 4,105,840, aqueous solutions of tannins and tannates; 3,825,434, a first coating of a phenolic, epoxide, etc., coated with an insolubilized hydrophilic polymer; and 4,142,033, a 2 layer coating of a dye and a methocel; and the like.

These coating materials, and others, have proved to be useful in reducing, and in many cases eliminating polymer build-up, but in some cases they have contributed to polymer discoloration. Further in some applications, as in materials exposed to food or in medical applications, the presence of smaller amounts of these materials is often required, so that their efficiency is reduced. The industry requires improved method to prevent this build-up on polymerization surfaces exposed to the polymerization medium.

SUMMARY OF THE INVENTION

Compositions of salts of water-soluble, carboxyl-containing polymers and surface active agents, deposited on polymerization reactor surfaces exposed to polymerization mixtures, substantially reduce or eliminate undesirable polymer build-up on reactor surfaces during aqueous polymerization of vinylidene monomers, even when the amount of carboxyl-containing polymers deposited on the reactor surfaces is very small.

DETAILED DESCRIPTION

That the herein defined water-soluble carboxyl containing polymer salt/surfactant compositions were effective in reducing or eliminating build-up on polymerization reactor surfaces when deposited on the reactor surfaces before a polymerization reaction of vinylidene monomers such as vinyl chloride were polymerized in aqueous media was quite surprising and unexpected. Usually, water soluble polymers, which are irreversibly adsorbable from water and water-miscible solvents, such as polyvinyl alcohol, polyacrylic acid, gelatin, albumin and the like, are not effective in preventing polymer build-up on reactor surfaces during polymerization reactions. In fact, materials such as gelatin actually contribute to and enhance polymer build-up on surfaces coated with this polymer.

Contrary to this, and quite unexpectedly, it was found that when solutions of the defined water-soluble anionic carboxyl-containing polymer salt/surfactant compositions were applied to reactor surfaces and dried, that polymer build-up on reactor surfaces during polymerization of vinylidene monomers in water was substantially reduced or eliminated. A further advantage of these materials for this important use is that they are colorless and inherently non-toxic in the form used.

The anionic, water-soluble, carboxyl containing polymer salts of this invention are ammonium, amine and metal salts of the defined carboxyl containing polymers. The metal salts are preferably alkali metal salts, i.e., sodium potassium and lithium. Polyvalent metal salts of these polymers may be used so long as the polymers are not substantially cross-linked and have the necessary degree of water-solubility. An amount of polyvalent metal salt less than a stoichiometric amount, but an amount to provide at least a partial salt thereof may be used. This is usually an amount of salt of less than about 30 weight percent of the available carboxyl groups. Of the amines, alkanolamines containing 1 to 6 carbon atoms form useful salts. Other amines, primary and secondary amines, containing from 1 to less than 8 carbon atoms are used since those amine salts made with amines containing greater than about 6 carbon atoms tend to have less than the desired degree of water solubility. Although, as in the case of polyvalent metals, partially soluble amine salts find some use.

The ammonium salts are useful as fugitive salts of these carboxyl-containing copolymers, deposited on the exposed reactor surfaces and heated to regenerate the carboxyl groups. The ammonium salts are obtained by reacting the carboxylic copolymers with ammonium hydroxide. In the case of dicarboxylic anhydride polymers, such as maleic anhydride, when reacted with ammonium hydroxide, one half of the carboxyl groups are converted to the amide and the other half to the ammonium salt.

The salt forming reaction is usually conducted in water or other polar solvents, and the carboxyl group of the carboxyl-containing polymer is reacted, for example, with a monovalent alkali metal hydroxide, carbonate, bicarbonate, oxide and the like; and with the defined alkanolamines and amines containing 1 to 6 carbon atoms; with ammonium hydroxide, or with about 5 to 20 weight percent, stoichiometrically, of a polyvalent metal compound, particularly the divalent alkaline earth metal hydroxides, bicarbonates, oxides of calcium, magnesium, barium and the like. Preferred, for ease of handling, and efficiency, are the alkali metal salts, ammonium salts, and the defined amine and alkanol amine salts.

Reactor surfaces are coated with the carboxyl-containing polymer salt compositions from solution by brushing, spraying and the like, and usually dried by heating. The amount of carboxyl-containing polymers deposited on the polymerization reactor surfaces can be an amount as small as at least about one ppm of polymer of the monomers being polymerized, providing a layer as thin as about 0.1 micron, up to about one micron or more. While about one micron has been found to be satisfactory in most vinyl chloride polymerizations, larger amounts may be used in coatings up to about 5 to 10 microns, if desired. If needed, thicker coats may be applied, but are usually not necessary.

The organic surface active agents, surfactants, used in conjunction with the polymer salt compositions include anionic, cationic and ionic emulsifiers known to those skilled in the art. Anionic materials are disclosed beginning on page 102 in J. Van Alphen's "Rubber Chemicals", Elsevier, 1956, for example, the alkali metal or ammonium salts of the sulfates of alcohols containing from 8 to 18 carbon atoms such as, for example, sodium lauryl sulfate; alkali metal and ammonium salts of sulfonated petroleum or paraffin oils; sodium salts of aromatic sulfonic acids such as dodecane-1-sulfonic acid and octadiene-1-sulfonic acid; the alkali metal salts of the aromatic sulfonic acids and the sodium salts of the aromatic sulfonic acids and the sodium salts of the alkyl aryl sulfonates of the formula R-[Ar-SO$_3$]-M$^+$ wherein R is alkyl or alkenyl having 8 to 20 carbon atoms, Ar is aryl or phenyl or naphthyl and M is the metal ion; alkyl aryl sulfonates such as sodium isoproyl benzene sulfonate and sodium dodecyl benezene sulfonate; alkali metal and ammonium salts of sulfonated dicarboxylic acid esters such as sodium dioctyl sulfosuccinate and disodium N-octadecyl sulfosuccinamate; alkali metal or ammonium salts of the free acids of complex organic mono-and diphosphate esters; and the like. In addition to the above-mentioned emulsifiers, sodium or potassium salts of diproportioned rosin acid soap as sodium dihydroabietate, fatty acid soaps such as sodium stearate and potassium oleate, alkali soaps of naphthenic acid, sulfated fatty acid amides and esters, sodium sulfates of acid esters as lauric and oleic, sodium salts of sulfonated oils, sodium naphthalene sulfonic acid condensate and the like may be used.

Cationic surface active agents include quaternary ammonium salts as cetyl dimethylbenzyl ammonium chloride, amine cationic surface active agents as the monooleate of triethanolamine, primary fatty amines as stearyl amine, tertiary amine-polyoxyethylene condensate as polyoxyethylene coco amine and quaternary amines as dicoco dimethyl ammonium chloride.

The typical nonionic surfactants useful for the purposes of the invention are those falling within the following generic classes, and having an HLB in the broad range of about 1 to about 17. HLB is explained and the method of determining the same is set out in "Nonionic Surfactants" edited by Martin J. Shick at pages 604–12, published in 1967 by Marcel Dekker, Inc., New York. Typical nonionic surfactants include, for example: (1) polyoxyethylene alkylphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol esters; and (7) poly-alkylene oxide block copolymers. Examples of surfactants in the above classes having the appropriate HLB are: sorbitan trioleate; sorbitan tritearate; polyoxyethylene sorbitol hexastearate; lactylated mono- and diglycerides of fatforming fatty acids, ethylene glycol fatty acid ester; mono- and diglycerides from the glycerolysis of edible fats; propylene glycol fatty acid ester; propylene glycol monostearate; sorbitan sesquioleate; polyoxyethylene sorbitol 4.5 oleate; glycerol monostearate; decaglyceryl tetraoleate; triglyceryl monooleate; sorbitan monooleate; sorbitan partial fatty esters; high-molecular-weigh fatty amine blend; sorbitan monostearate; diethylene glycol fatty acid ester; polyoxyethylene (2) stearyl ether; polyoxyethylene (2) oleyl ether; polyoxyethylene sorbitol beeswax derivative; polyoxyethylene (2) cetyl ether; diethylene glycol monolaurate (soapfree); sorbitan monopalmitate; high-molecular-weight amine blend; sorbitan monooleate polyoxyethylene ester mixed fatty and resin acids blend; polyoxypropylene mannitol dioleate; polyoxyethylene sorbitol lanolin derivative; sorbitan monolaurate; polyoxyethylene sorbitol esters of mixed fatty and resin acids; polyoxyethylene fatty acid; polyoxyethylene sorbitol oleate; polyoxyethylene sorbitan monostearate; polyoxyethylene sorbitol tallow esters; polyoxyethylene sorbitol tall oil; polyoxyethylene lauryl ether; polyoxyethylene sorbitan monooleate; polyoxyethylene sorbitol hexaoleate; polyoxyethylene sorbitan tristearate; and polyoxyethylene sorbitan trioleate.

Typical surfactants in the above-named classes there may be named the following: polyoxyethylene (20) sorbitan monooleate, polyoxyethylene (20) sorbitan monopalmitate, polyoxyethylene (40) stearate, polyoxyethylene (50) stearate, polyoxyethylene esters of mixed fatty resins acids, polyoxyethylene (20) palmitate, polyoxyethylene glycol monolaurate, polyoxyethylene glycol ricinoleate, polyoxyethylene glycol monostearate, polyoxyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) cetyl stearyl ether, polyoxyethylene (30) cetyl stearyl ether, polyoxyethylene (8) tridecyl ether, polyoxyethylene (9) nonyl phenyl ether, polyoxyethylene (21) coconut ester, and the like.

The ethoxylated tertiary amines include those having one fatty acid alkyl group derived from fatty sources having from 12 to 18 carbon atoms and two polyoxyethylene groups attached to the nitrogen and having the formula:

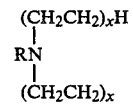

and which are the reaction products of a N-alkyl amine and ethylene oxide; and derivatives of the polyethoxylated aliphatic amines obtained by the reaction therewith of methyl chloride, which have the formula

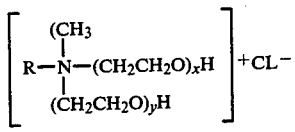

Closely related materials are reaction products of N-alkyl trimethylene diamines and ethylene oxides having the formula

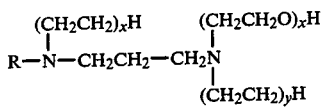

In all of these R is an alkyl group containing from about 10 to 22 carbon atoms, more preferably 12 to 20 carbon atoms, being derived from, for example, myristic lauric, malmitic, stearic, oleic, abietic, linoleic, linolenic and like fatty acids; and x, y and z are greater than 2 and more preferably are from about 5 to 50 mols per mol of fatty amine. Preferably, these materials contain greater than 5, as about 10 to 25 mols of ethylene oxide agents containing as high as about 10 mols of ethylene oxide may be used. As examples of the block copolymer surfactants in the family of surfactants manufactured by BASF/Wyandotte and sold under the trademark "Pluronic". These surfactants are polyethylene oxide-polypropylene oxide block copolymers and have the following general formula:

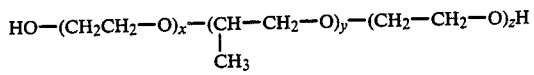

wherein the sum of x and z is an integer from 1 to 212 and y is an integer from 16 to 69.

Without a surfactant, water-soluble salts of the defined carboxyl-containing polymers result in poor wetting of stainless steel or polyvinyl chloride surfaces and therefore provide little improvement in build-up over a control, a reactor not coated.

The use of a broad range of surfactants with the carboxyl-containing polymer salt at concentrations sufficient to allow the aqueous coating solutions to wet the reactor walls will result in excellent build-up prevention. By "good wetting" is meant a stainless steel or polyvinyl chloride film (representing a reactor wall with some thin polyvinyl chloride build-up already present) obtained when dipped into coating solution and removed and allowed to drain in a vertical position, will show no tendency for the coating solution to retract from the edges or collect in islands before drying. This condition indicates a contact angle of close to 0° when the coating solution is contacted with the reactor surfaces. When a metal or solid surface is non-wettable, a liquid thereon, such as water, will form droplets and not flow out into a smooth film. Best results in reducing polymer build-up are normally obtained when the salt-surfactant solution completely wets the reactor surface and does not substantially retract or dewet prior to drying. However, improvement in reducing polymer build-up is observed when at least about 50% of the surface is wetted, more preferably, greater than about 75%.

The angle formed between the tangent of the side of the droplet and the metal or glass surface is called the "contact angle" and is referred to as "theta" ($\theta$). Water wettability may be measured, for example, by a rather simple method, the so-called water break test found in "Metals Handbook", 8th Edition, Volume 2, American Society for Metals, page 316. While it is preferred, and better results are obtained, when the salt-surfactant solution has a contact angle in the range of about 0°; improved results in reducing polymer build-up are observed when the contact angle is less than about 30°, more preferably less than about 5°.

Whereas the surface tension of the solutions of partially or completely neutralized polymer solutions of this invention is in the neighborhood of 50 to 70 dynes/cm, the addition of low concentrations of surfactants lowers this value depending on the concentration and type of surfactant employed. When the surface tension is lowered to < the $\gamma c$ (critical surface tension as defined by E. G. Shafrin and W. A. Zisman, J. Phys. Chem., 64, 519-24 [1960]) of the reactor surface good wetting normally results (that is a contact angle of close to 0°). The $\gamma c$ of polyvinylchloride is 39 dynes/cm, whereas typically an organic contaminated stainless steel surface will have a $\gamma c$ of about 33 dynes/cm. Therefore, addition of sufficient surfactant to lower the surface tension of the coating solution to about 33 dynes/cm or less will result in the required good wetting of the reactor walls by the coating. The amount of surfactant used is an amount added at or above a critical amount which results in a contact angle of less than about 30°, more preferably about a 0° contact angle for the aqueous coating solution in contact with the reactor surfaces, and provides a wet surface of solution greater than 50% coverage, more preferably in the range of about 100%.

Acidic polymer solutions, pH 3 to 4 in their natural states, have somewhat lower surface tensions, about 40 to 55 dynes/cm, than their partially or fully neutralized solutions of this invention; however, the absence of a wettability problem for these acidic solutions is due to the fact that these solutions deposit an irreversibly adsorbed polymer monolayer on the reactor surfaces soon after contact, which is wet by the coating solution. When the polymers under consideration are neutralized to about 10% or more, irreversible adsorption does not occur, and the coating is easily removed by water. While the amount of surfactant used to prevent this is normally only that required to obtain surface wetting; that is a angle of less than about 1°, larger amounts may be used so long as they do not interfere with the polymerization system. The amounts of surfactant normally used will be from about 0.001 to about 10 weight parts per 100 weight parts of carboxyl-containing polymer salt, more preferably from about 0.2 to about 2 weight parts.

The carboxyl-containing polymers will contain from about 30 to about 80 mole percent of residues equivalent to olefinically unsaturated monocarboxylic acid monomers, and about 70 to 30 mole percent of residues equivalent to at least one other vinylidene monomer having at least one terminal >$CH_2$ group. In other words, the residue of acrylic acid, for instance, in a polymer, is

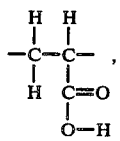

whether derived from polymerization of acrylic acid, or hydrolysis of ester groups as in polyethylacrylate, for example, amide or nitrile and like hydrolyzable groups in polymers. The residue of typical comonomers, in a copolymer thereof such as ethylene and ethyl acrylate in the polymer chain are,

for ethylene; and

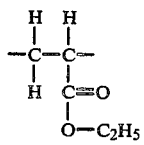

for ethyl acrylate; being obtainable by copolymerizing ethyl acrylate, or by esterification of a carboxyl group, as an acrylic acid residue in polyacrylic acid. In any event, the anionic water-soluble polymer must contain residues equivalent to carboxyl-containing monomers and residue equivalent to at least one other copolymerized vinylidene comonomer in the hereinafter defined amounts, and have a minimum water solubility.

The mole percent of carboxyl groups derived from monocarboxylic acids, or the equivalent thereof, as by the hydrolysis of ester, amide and nitrile groups, must be greater than 25 mole percent carboxyl groups per mole of polymer, and more preferably is from about 35 to 65 mole percent. As to dicarboxylic acids and anhydrides, such as maleic acid, and the anhydride thereof, the mole percent of carboxyl groups in the copolymers must be from about 50 mole percent to about 100 mole percent, the copolymers containing about 50 mole percent maleic acid and about 50 mole percent of other vinylidene comonomers. While these maleic acid anionic copolymers may contain up to 100 mole percent of carboxyl groups, compared to only about 80 mole percent in monocarboxylic acid polymers, the difference in amounts of carboxyl allowable lies in the presence of carboxyl groups on adjacent carbon atoms in maleic acid, and this affects the activity of the acid groups. For example, the pKa of acrylic acid is 4.25, while that of maleic acid is 1.83. In this application, maleic acid copolymers containing 100 mole percent carboxyl groups (50 mole percent maleic acid) are about equivalent in effectiveness as acrylic acid copolymers containing about 50 mole percent carboxyl groups.

The carboxyl-containing polymer salts preferably have a water-solubility, of at least about 10 weight percent in water, preferably about 50, to complete 100%, water solubility. The polymers preferably are substantially water soluble. The polymers have weight average molecular weights from about 3,000 to about 1,000,000 or more, or high as 10,000,000 for example, more preferably from about 5,000 to about 500,000.

These essential polymers may be obtained in a number of ways. They may be obtained by direct copolymerization of unsaturated carboxylic acids with vinylidene comonomers containing at least one terminal $>CH_2$ group. They may also be obtained by esterification of carboxylic acid homopolymers; or by hydrolysis of ester, amide or nitrile groups of polymers containing sufficient hydrolyzable groups to provide the required amount of carboxyl groups. Another efficient method to obtain the polymers is by esterification of maleic anhydride copolymers with alcohols and/or water to the desired carboxyl content. Another useful method is by the hydrolysis of carboxylic acid chlorides, as acrylyl chloride groups, in copolymers. Carboxyl-containing polymers can also be obtained from copolymers of butadiene-1,3, for example, containing about 30 weight percent styrene copolymerized therewith, by carboxylating the unsaturated groups of the butadiene-1,3 residues in the copolymer with maleic anhydride, mercapto-substituted carboxylic acids such as beta-mercaptopropionic acid, or alkali metal monosalts of saturated dicarboxylic acid such as monosodium succinate.

In preparing the defined copolymers, it is considered more efficient and economical to obtain the carboxyl-containing copolymers by direct copolymerization of the carboxylic monomers or anhydrides, when appropriate, with the vinylidene comonomers, than to obtain the carboxyl groups indirectly as by hydrolysis, and the like.

The carboxylic monomers used in preparing the coating materials are olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, —C═C—COOH; or as part of a terminal methylene grouping $CH_2{=}C{<}$. Olefinically-unsaturated acids of this class include such materials as the acrylic acids typified by the acrylic acid itself, methacrylic acid, ethacrylic acid, alpha-cyano acrylic acid, beta methacrylic acid (crotonic acid), alpha-chloro-acrylic acid, alpha-phenyl acrylic acid, beta-acryloxy propionic acid, sorbic acid, alpha-chloro sorbic acid, angelic acid, cinnamic acid, p-chloro cinnamic acid, beta-stearyl acrylic acid, 1-carboxy-4-phenyl butadiene-1,3, itaconic acid, citraconic acid, mesaconic acid, glutaconic acid, aconitic acid, maleic acid, fumaric acid, tricarboxy ethylene, and the like. As used herein, the term "carboxylic acid" includes the polycarboxylic acids and acid anhydrides, including maleic acid anhydride, wherein the anhydride group is formed by the elimination of one molecule of water from two carboxyl groups located on the same polycarboxylic acid molecule. Maleic anhydride and other acid anhydrides useful herein have the general structure

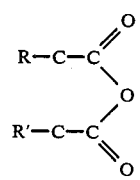

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers are the monoolefinic acrylic acid and acrylic acid anhydride, maleic acid and maleic acid anhydride. The acrylic acids have the general structure

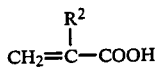

wherein $R^2$ is a substituent selected from the class consisting of hydrogen, halogen, and the cyanogen (—C≡N) groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred.

The defined carboxylic acids are copolymerized with one or more other vinylidene monomers containing at least one terminal >CH$_2$ group. Such monomers include, for example, acrylate ester monomers including those acrylic acid ester monomers such as derivatives of an acrylic acid represented by the formula

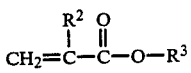

wherein $R^3$ is an alkyl group having from 1 to 30 carbon atoms, preferably 1 to 20, and more preferably 1 to 12 carbon atoms, and $R^2$ is hydrogen, methyl or ethyl, present in the copolymer in amount, for example, from about 1 to 40 weight percent or more. Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl methacrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate, and the corresponding methacrylates. Mixture of two or three acrylic esters may be successfully polymerized with one of the carboxylic monomers.

Homopolymers or copolymers of these acrylate esters may be prepared and hydrolyzed as with caustic to obtain the desired carboxyl-containing polymers.

Other useful vinylidene comonomers include $\alpha,\beta$-olefinically unsaturated nitriles, preferably the monoolefinically unsaturated nitriles having from 3 to 10 carbon atoms atoms such as acrylonitrile, methacrylonitrile, and the like. Most preferred are acrylonitrile and methacrylonitrile. Acrylic amides including monoolefinically unsaturated amides also may be used. These have at least one hydrogen on the amide nitrogen and the olefinic unsaturation is alpha-beta to the carbonyl group. Representative amides include acrylamide, methacrylamide, N-t-butyl acrylamide, N-cyclohexyl acrylamide, and others. Preferred are acrylamide and methacrylamide. Other acrylic amides include N-alkylol amids of alpha, beta-olefinically unsaturated carboxylic acids including those having from 4 to 10 carbon atoms such as N-methylol acrylamide, N-propanol acrylamide, N-methylol methacrylamide, N-methylol maleimide, N-methylol maleamic acid esters, the N-alkylol amides of the vinyl aromatic acids such as N-methylol-p-vinyl benzamide, and the like. These nitrile and amide containing polymers can be hydrolyzed to form carboxyl groups. Also useful are $\alpha$-olefins containing from 2 to 12 carbon atoms, more preferably from 2 to 8 carbon atoms; dienes containing from 4 to 10 carbon atoms; vinyl esters and allyl esters such as vinyl acetate, vinyl butyrate and the like; vinyl aromatics such as styrene, $\alpha$-methyl styrene, vinyl toluene, chlorostyrenes, nitrostyrene and the like; vinyl and allyl ethers and ketones such as methyl vinyl ketone; alkyl vinyl ethers of the formula CH$_2$=CH—OR, wherein R is an alkyl group containing 1 to 6 carbon atoms such as methyl vinyl ether, ethyl vinyl ether, propyl vinyl ether, and the like; and vinyl ethers of the formula (—CH$_2$CH$_2$O—)$_n$R wherein n is 1 to 4 and R is an alkyl radical containing 1 to 4 carbon atoms; chloroacrylates, cyanoacrylates such as $\alpha$-cyanomethyl acrylate, the $\alpha$-, $\beta$- and $\gamma$-cyanopropyl acrylates; alkoxyacrylates such as methoxy ethyl acrylate; haloacrylates as chloroethyl acrylate; hydroxy alkyl acrylates; glycidyl acrylate and methacrylate; vinyl halides and vinyl chloride, vinylidene chloride and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis($\beta$-haloalkyl)vinyl phosphonates, and the like.

The polymerizations to form the carboxyl-containing copolymers are conducted in mass or in inert liquid media. The monomers may be batch charged or continuously added during the course of polymerization, or by any other manner of polymerization techniques conventionally used. In one preferred method, the medium has some solubilizing effect on one or more of the monomeric ingredients, but substantially none on the resulting polymer. In other words, the medium used for the polymerization is one in which the monomers are preferably soluble and the polymer is substantially insoluble. Typical solvents include hydrocarbon containing 6 to 8 carbon atoms, such as benzene, tetralin, hexane, heptane, cyclohexane, carbon tetrachloride, chloroform, trichloroethylene, methyl chloride, ethyl chloride, and methylene chloride, chlorofluoroalkanes such as chlorofluoromethane and chlorofluoroethane containing at least 4 halogen atoms; dimethyl formamides and tetrahydrofuran; esters such as methyl acetate and ethyl acetate; alcohols including methanol, ethanol, butanol; ketones such as acetone and methyl ethyl ketone; water and the like. The amount of organic medium used normally will be in excess of the monomers to be polymerized and the proportion may vary from at least 1 weight percent of monomers and 99 weight percent organic medium up to about 50 weight percent monomers and 50 weight percent medium.

Polymerization of the monomers is usually carried out in the presence of a free-radical forming or ionic catalyst in a closed vessel in an inert atmosphere under autogenous pressure or artificially-induced pressure, or in an open vessel in an inert atmosphere under reflux at atmospheric pressure, in batch or continuous systems with proper agitation. Temperature of the polymerization may be varied from about 0° C. to 125° C. or lower or higher. Polyermization at 25° C. to 90° C. using a free radical catalyst is generally effective in producing polymer yields of 75% to 100%. Typical free radical forming catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, di(2-ethylhexyl)peroxydicarbonate, and the like, as well as azo catalysts such as azodiisobutyryl nitrile. Other catalysts utilized are the so-called "redox" type of catalyst and the heavy-metal activated catalyst systems. Ultra-violet light may also be used as a source of free radicals.

Typical carboxyl-containing polymers are those obtained by copolymerizing 35 to 65 weight percent of acrylic acid with 65 to 35 weight percent of ethyl acrylate, propyl acrylate or butyl acrylate; and 50 mole percent of methacrylic acid with 50 mole percent ethyl acrylate. Equivalent carboxyl-containing copolymers may be prepared by reacting sufficient trimethyl ortho acetate with polyacrylic acid to obtain polymers containing 35 to 50 weight percent carboxyl groups and 65 to 50 weight percent ethyl ester groups.

Maleic acid copolymers are readily obtained by preparing copolymers of 50 mole percent maleic anhydrides and 50 mole percent of methyl vinyl ether, styrene, ethylene, and the like, which are then hydrolyzed with alcohols to convert one half of the carbonyl groups of the anhydride to carboxyl groups and the other half to esters. For instance, ethyl, propyl or butyl esters obtained from ethyl alcohol, propyl alcohol or butyl alcohol. Similar carboxyl containing polymers are obtained from copolymers containing 50 mole percent maleic anhydride and 50 mole percent ethylene or styrene; from styrene copolymers with fumaric acid; and the like. Salts are then made from these materials.

The salts are readily prepared, for example, by reacting the carboxyl-containing copolymer in a liquid media, usually water, with, for example, ammonium hydroxide, alkanolamines, the defined amines, or alkali metal hydroxide solutions. These reactions and methods are well known to those skilled in the art. Normally, at least a stoichiometric amount of salt former will be used, usually a slight excess to insure conversion of the carboxyl groups to the salt. Less than complete conversion to the salt, that is greater than about 10% to 100%, may be used. An unused excess is normally not desirable.

Reactor surfaces are coated with the carboxyl containing polymer salts and surfactant composition from solution by brushing, spraying and the like, and can be dried by heating, applying a vacuum and the like. In the solutions the solvent used will depend on the solubility of the polymer salt and/or surfactant. Water or organic solvents may be used. The concentration in the solution may vary widely depending on the solubility of the polymer salt and/or surfactant in the solvent and the requirements of the method used to coat the reactor surface. Spraying is an efficient method but other methods known to those skilled in the art may be used. In any event, the concentration of the solution should be such so that one can deposit the desired amount of composition on the reactor surfaces.

The amount of carboxyl-containing polymer salt composition deposited on the polymerization reactor surfaces can be an amount as small as at least about one ppm of polymer of the monomers being polymerized, providing a layer as thin as about 0.1 micron, up to about one micron or more. While about one micron has been found to be satisfactory in most vinyl chloride polymerizations, larger amounts may be used in coatings up to about 5 to 10 or more microns, if desired. If needed, thicker coats may be applied, but are usually not necessary.

In accordance with this invention, once the reactor surfaces are coated, multiple polymerization reactions may be run without opening the reactor between charges. Although multiple charges may be run without recoating the surfaces, it has been found to be useful, and preferred, to recoat the internal surfaces of the reactor after each charge, to insure uniform and efficient production. Spray nozzles are used in applying the coating solution to the inner surfaces of the reactor since with this method all inner surfaces of the reactor are more easily reached in the least amount of time. When it is decided to recoat the reactor, the reactor is drained, and the inner surfaces are flushed with water. Using the spray nozzles, these steps can be accomplished without reopening the reactor. This process can be repeated after each charge or periodically after a certain number of charges, as required, depending upon the production schedule and the down-time allotted to each reactor.

The novel reactor coatings and process of the invention are applicable to the polymerization of any vinylidene monomer in aqueous medium but is particularly useful in the polymerization of vinyl halide or vinylidene halide monomers, optionally copolymerized with other vinylidene comonomers, in pressure vessels with water in the presence of dispersing, suspending or emulsifying agents and free radical forming catalysts, usually, peroxy catalysts. The polymerizations are normally conducted in the range of about 30° to 60° C., lower temperatures as from about 0° C. to about 100° C. The polymerization may be conducted in batch or continuous operations. Also, the reactants may be partly premixed, proportioned and the like as is the practice in the art.

The vinyl or vinylidene halide monomers correspond to the structural formula

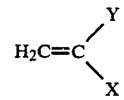

wherein X is a halogen selected from the group consisting of chlorine, bromine or fluorine and Y is hydrogen or a halogen the same as defined for X.

In addition to the vinyl chloride monomer, one or more other copolymerizable olefinically unsaturated, vinylidene comonomers, perferably containing at least one terminal vinylidene group, $>CH_2$, more preferably a terminal methylene group ($H_2C=C<$), may also be employed therewith. The amount of vinyl chloride monomer will range from about 40% or more, preferably about 50%, to 100% by weight of the total monomers polymerized. Usually less than about 50% by weight of the copolymerizable vinylidene comonomers is present in vinyl chloride copolymers. Copolymerizable comonomers include dienes of 4 to 10 carbon atoms, such as butadiene-1,3; ethylidene norborene, dicyclopentadiene and other cyclic dienes; α-olefins such as ethylene, propylene, isobutylene, butene-1 and 4-methylpentene-1, 1-octene, and the like preferably containing 1 to 4 carbon atoms; vinyl bromide, vinylidene chloride, vinyl fluoride; vinyl esters such as vinyl acetate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, isobutyl vinyl ether, methyl vinyl ketone, ethyl vinyl ketone, and the like; α,β-olefinically unsaturated nitriles such as acrylonitrile, methacrylonitrile; cyanoalkyl acrylates such as β-cyanomethyl acrylate and the α-, β- and γ-cyanopropyl acrylates; esters of olefinically unsaturated carboxylic acids including α,β-olefinically unsaturated acids such as methyl acrylate, ethyl acrylate and the like wherein the alkyl groups contain 1 to 20, preferably 1 to 8, carbon atoms, chloropropyl acrylate, methyl methacrylate, ethyl methacrylate, methyl ethacrylate, 2-ethylhexyl acrylate, cyclohexyl acrylate, phenyl acrylate, glycidyl acrylate, glycidyl methacrylate, ethoxyethyl acrylate, and the like; esters of maleic and fumaric acid as methyl fumarate; polyfunctional monomers such as methylene bisacrylamide; ethylene glycol dimethacrylate, diethylene glycol diacrylate, divinyl benzene and allyl pentaerythritol; bis(β-haloalkyl)alkenyl phosphonates such as bis(β-chloroethyl)vinyl phosphonate; amide monomers derived from an α,β-olefinically unsaturated carboxylic acid and having the structural formula

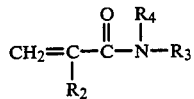

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like; α,β-olefinically unsaturated N-alkylol amides or, α-olefinically unsaturated N-alkoxyalkyl amides of the formula

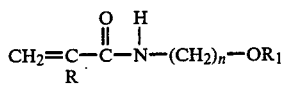

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide.

In carrying out the polymerization reaction the usual catalysts or initiators which normally form free radicals, including organic peroxides and aliphatic azo compounds are used. Such materials include, for example, α,β'-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as esterbutyl peroxyacetate, tert-butyl peroxyisobutyrate, tert-butyl peroxypivalate, tert-butyl peroxy(2-ethyl-hexanoate); alkyl peroxides such as α,β'-bis-(t-butylperoxy)diisopropylbenzene, n-butyl-4,4-bis(tert-butylperoxy)valerate, di-tert-amyl peroxide, dicumyl peroxide, 2,5-dimethyl-2,5-bis(tert-butyl hydroperoxide), 1,1,3,3-tetramethyl butyl hydroperoxide, cumene hydroperoxide, 2,5-dimethylhexane-2,5-dihydroperoxide, diisopropylbenzene hydroperoxide; ketone peroxides; methyl ethyl ketone peroxides; sulfonyl acyl peroxides such as acetyl cyclohexyl sulfonyl peroxide; acetyl sec-heptylsulfonyl peroxide; peroxy carbonates such as tert-butyl-peroxy isopropyl carbonate; peroxy dicarbonates such as bis(4-t-butylcyclohexyl)-peroxy dicarbonate, dicyclohexyl peroxydicarbonate, diisopropyl peroxydicarbonate; di(2-ethyl hexyl)peroxydicarbonate, tertiary alkyl perketals such as 2,2-bis(tert-butylperoxy)butane; mixtures thereof; bis(4-tert-butyl cyclohexyl)peroxydicarbonate, di-(2-ethyl hexyl)-peroxydicarbonate, diisononanoyl peroxide, benzoyl peroxide, t-butyl hydroperoxide, t-buttyl peroxypivalate, cumene hydroperoxide, cyclohexyl hydroperoxide, tert-butyl peroxyneodecanoate, and the like; useful initiators or catalysts are the water-soluble peroxygen compounds, such as hydrogen peroxide, persulfates, such as potassium persulfate, ammonium persulfate, and the like. Also, mixtures of catalysts or initiators may be employed, either water-insoluble or water-soluble or both. For example, a 50-50 mixture of di(2-ethyl hexyl)-peroxydicarbonate and diisononanoyl peroxide can be used. Whether a single initiator or a mixture of initiators is employed, the amount thereof will be in the range of about 0.01% to about one or more percent by weight, based on the weight of 100 parts of monomer or monomers being polymerized, and preferably in the range of about 0.015% to about 0.15% by weight although large amounts may be used if desired. Often used are lauroyl peroxide, di-ethyl peroxydicarbonate, di(n-propyl)-peroxydicarbonate, diisopropyl peroxydicarbonate, di(sec-butyl)peroxydicarbonate and acetyl cyclohexane sulfonyl peroxide.

In suspension polymerization systems, the suspending agents usually employed include partially hydrolyzed polyvinyl acetate, polyvinyl alcohol; cellulose ether; gelatin; polyacrylic acid; alkyl cellulose wherein the alkyl groups contain 1 to 4 carbon atoms and derivatives thereof such as hydroxy, methyl, ethyl and the like, such as methyl cellulose and hydroxy ethyl cellulose. These suspending agents may be used in conjunction with secondary dispersants and small amounts of emulsifiers such as alkyl benzene sulfonate, alkyl sulfates, and the like. Other usual additives may be included as buffers, salts, modifiers and the like. The suspending agents are generally used in amounts from about 0.01 phm to 0.5 phm, more preferably from about 0.02 to 0.07 phm (parts per hundred of monomer).

For aqueous emulsion polymerization techniques, the aqueous reaction medium will contain one or more emulsifiers or an emulsifier system, such as a salt of a long chain fatty acid and a long straight chain saturated alcohol. Usually, an alkali metal or ammonium salt of a long chain saturated fatty acid is used as the emulsifier or as part of the emulsifier system. The saturated fatty acids referred to may be either natural or synthetic and should contain from 8 to 20 carbon atoms. As examples of such acids there may be named lauric, myristic, palmitic, stearic, and the like, beef tallow, coconut oil, resin acids, naphthenic acids and the like. Excellent results are obtained when the anionic emulsifiers are alkali metal or ammonium salts of the sulfates of alcohols having from 8 to 18 carbon atoms. Examples of such emulsifiers include sodium lauryl sulfate, ethanolamine lauryl sulfate, ethylamine lauryl sulfate, and the like; alkali metal and ammonium salts of sulfonated petroleum and parraffin oils; sodium salts of hydrocarbon sulfonic acids, such as dodecane-1-sulfonic acid and octadiene-1-sulfonic acid; sodium salts of alpha-olefin sulfonates; aralkyl sulfonates, such as sodium isopropyl benzene sulfonate, sodium dodecyl benzene sulfonate, sodium isobutyl naphthalene sulfonate, and the like; alkali metal and ammonium salts of sulfonate and the like; alkali metal and ammonium salts of sulfonate dicarboxylic acid esters, such as sodium dioctyl sulfosuccinate, disodium-octadecyl sulfosuccinate, and the like; alkali metal and ammonium salts of free acid of complex organic mono and di-phosphate esters, and the like; nonionic emulsifiers such as octyl- or nonyl-phenyl polyethoxyethanol; poly(alkoxy)non-ionics, and particularly polyethers as poly(oxyethylene)sorbitol laurate, poly(oxyethylene)stearates, poly(oxyethylene)esters of mixed fatty and rosin acids, fatty alcohol ethylene oxide condensates, glycerol monostearate, sorbitan esters of fatty acids, diethylene glycol stearate and the like may be used. Cationic surface active agents include quaternary ammonium salts as cetyl dimethylbenzyl ammonium chloride, amine cationic surface active agents as the monooleate of triethanolamine, primary fatty amines as stearyl amine, tertiary aminepolyoxyethylene condensate as polyoxyethylene coco amine and quaternary amines as dicoco dimethyl ammonium chloride.

Better results are obtained with anionic or non-ionic surface active agents compared to cationic surface active agents. However, the latter may be used, particularly where low foaming characteristics are desired and in conjunction with anionic and non-ionic surface active agents. More preferred of these two are the anionic surface active agents.

Vinyl polymer latices having excellent stability are obtained when employing the alkali metal and ammonium salts of aromatic sulfonic acid, aralkyl sulfonates and long chain sulfonates. The emulsifier is employed usually in an amount in the range of about 0.1% to about 5.0% by weight, based on the weight of monomer or monomers being polymerized, and preferably, an amount of emulsifier in the range of about 0.5% to about 2.5% is used. When employing more than one emulsifier in the system, the combined weight thereof will be in the same ranges.

In addition to the compounds named above, it is very often desirable, in order to obtain certain desirable vinyl dispersion resin properties, to employ in the polymerization one or more long straight chain alcohols, containing from 8 to 24 carbon atoms, in the emulsifier system. The addition of the alcohol(s) increases the colloidal stability of the polymerization system. As examples of such alcohols there may be named octanol, nonanol, decanol, undecanol, dodecanol, tridecanol, tetradecanol, pentadecanol, heptadecanol, octadecanol, nonadecanol, eicosanol, heneicosanol, docosanol, tricosanol, tetracosanol, and the like. As an example of a mixture of alcohols there may be mentioned the use of a 12 carbon alcohol plus an 18 carbon alcohol. Further, ethoxylated alcohols can be used, such as a mixture of ethoxylated linear primary alcohols containing from 12 to 15 carbon atoms, etc. The ratio of alcohol to emulsifier can range from 0.15 to 1.0 or greater depending upon the emulsifier being used. For example, when the emulsifier is an ammonium salt of a fatty acid, the ratio of alcohol to fatty acid salt can be 1.0 but preferably the ratio is greater than 1.0.

In the aqueous polymerization of vinyl monomers, the polymerization is conducted at a pH in the range of about 2.0 to about 10.0. The amount of alkaline agent needed to properly adjust and maintain the proper pH will depend in part on the particular system being used in the reaction mixture. Other usual additives such as buffers, modifiers and the like may be used.

EXAMPLES

In the following Examples, ½ by 2½ inch ferrotype panels were coated with the described carboxyl-containing polymers; the coatings were dried and the coated panels were wired to baffles in a 3 liter polymerization reactor. The reactor was equipped with heating and cooling means, stirring means and baffles attached to the walls of the reactor. The following polymerization recipe and stated procedure were used in all of the Examples of this Specification:

The polymerization recipe was: 1000 grams of vinyl chloride, 2055 grams of dimineralized water, 0.5 gram of 88% hydrolyzed polyvinyl acetate (Vinol 540) and 0.5 ml of di-secondary butyl peroxydicarbonate. The reactor was completely filled, and water was added to keep the reactor full. The polymerizations were conducted at 57° C. After addition of 400 grams of water, 80% of the vinyl chloride having been converted to poly(vinyl chloride), the reaction was stopped by cooling and the contents of the reactor were removed. After removal of the polymer mixture, the internal surfaces of the reactor were rinsed with water and the panels removed for inspection.

There are two general types of polymer build-up on reactor surfaces exposed to polymerization mixtures, a papery coating and at a later stage, sandy or grainy feeling and appearing surfaces that are rather hard. Both types are not always observed. The amounts of these deposited materials observed is compared to and based on paper and sandy build-up on a stainless-steel surface in a standard polymerization process in the absence of surface coatings. An arbitrary value of 1.5 is assigned to that build-up condition normally observed in the absence of coating materials used to reduce wall build-up. A rating of 0.0 is perfect, representing no build-up at all on the stainless steel surfaces. Values below 1.0 are considered values representing substantial improvement in decreased polymer build-up. Therefore, in testing coating materials to determine whether they provide reduced polymer build-up on reactor surfaces, those materials that result in values of one or more are not considered useful for the purpose, while those materials resulting in values less than one, preferably less than 0.5, represent definite and useful improvement in decrease in polymer build-up. Both paper and sand type deposite values are assigned.

EXAMPLE I

One-half inch by 2½" stainless steel panels were dropped into solutions of 2.5% of a copolymer of 50 mol percent of maleic anhydride and 50 mol percent methyl vinyl ether, specific viscosity $\eta sp$ 2.6–3.5, hydrolyzed in water to 100% acid form, in water in the (1) unneutralized form and (2) fully neutralized with NaOH to form the polymer salt. Surfactants at the indicated concentrations were then added to the NaOH (pH 10) solution. The effects on wettability observed when the coating panels were allowed to drain in a vertical position are listed. Table I shows the wettability results obtained.

TABLE I

| Panel | Solution | Dipped and Drained | Approximate Contact Angle |
|---|---|---|---|
| #1 | pH 2, acidic | wets completely | 0° |
| #2 | pH 10 (Na salt form) | Retracts, 95% area dewets | 65° |
| #3 | pH 10 + .005% Triton X-100[1] | Retracts at edges, 50% area dewets | 30° |
| #4 | pH 10 + .25% Triton X-100 | wets completely | 0° |
| #5 | pH 10 + .025% Na lauryl sulfate | wets completely | 0° |
| #6 | pH 10 + .050% Tween 21[2] | Sl. retraction, 10% area dewets | 20° |
| #7 | pH 10 + .075% Tween 21 | V. Sl. retraction, 2% area dewets | 5° |
| #8 | pH 10 + .025% Ethomeen C-25[3] | wets completely | 0° |
| #9 | Control - water | Retracts - 95% area dewets | 80° |
| #10 | pH 10 + .20% Span 20[4] | wets, sl. irregular | 0° |
| #11 | pH 10 + .025% Pluronic L122[5] | wets completely | 0° |

[1] Octylphenoxyethanol 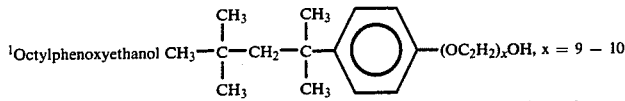 $(OC_2H_2)_xOH$, $x = 9 - 10$

[2] A polyoxyethylene derivative of fatty acid partial esters of sorbitan anhydride, polyoxyethylene (4) sorbitan monolaurate.

[3] A polyoxylated aliphatic amine, $C_{12}H_{25}N\begin{array}{c}(C_2H_4O)_x\\ (C_2H_4O)_y\end{array}$, wherein $x + y = 15$.

[4] A fatty acid partial ester of sorbitan, sorbitan monolaurate.

[5] A polyoxyalkylene derivative of propylene glycol, a block copolymer consisting of propylene oxide and ethylene oxide units having the formula $HO(C_2H_4O)_a(C_3H_6O)_b(C_2H_4O)_cH$, wherein $a + c = 23$.

EXAMPLE II

Six stainless steel panels with room temperature dried coatings from Table I representing a broad range of wettability and surfactant additions, and a control, were attached to the baffles of the 3L reactor and exposed to the standard build-up suspension polymerization receipe given above.

TABLE II

| Panel | Coating | Original Dried Coating Thickness | Build-Up (Morning Star Ratings) |
|---|---|---|---|
| #2 | pH 10 | 0.98 μ | 1.0/1.0 |
| #3 | pH 10 + .005% T-100[1] | 0.73 μ | 0.2/0.4 |
| #4 | pH 10 + .25% T-100 | 1.04 μ | 0/0.1 |
| #5 | pH 10 + .025% SLS | 0.86 μ | 0.2/0.2 |
| #7 | pH 10 + .075% Tween 21 | 0.95 μ | 0.4/0.4 |
| #8 | pH 10 + .025% Ethomeen C-25 | 0.97 | 0/0 |
| #9 | Control | none | 1.0/1.0 |

[1] Triton X-100.

These data clearly show the reduction in polymer build-up on reactor surfaces when said surfaces are coated with the polymer salt-surfactant compositions of this invention, compared to uncoated surfaces or surfaces coated with the polymer salt alone. Similar unsatisfactory results are obtained when the reactor surfaces are coated with the surfactant alone; the critical combination of the defined polymer salts and surfactants being necessary to obtain the advantages of the invention.

I claim:

1. A polymerization reaction vessel having the internal surfaces thereof that are exposed to a polymerization reaction mixture coated with a material consisting essentially of an anionic, water-soluble ammonium, amine or metal carboxyl copolymer salt, said copolymer being greater than about 10 to 100% salt, and a water-soluble surface active agent present in amount sufficient to provide a contact angle of less than about 30°.

2. A polymerization reaction vessel of claim 1 wherein said copolymer salts contain about 30 to about 80 mole percent of residues equivalent to olefinically unsaturated monocarboxylic acids and about 70 to about 20 mole percent of residues equivalent to at least one copolymerizable vinylidene comonomer having at least one terminal $>CH_2$ group, said surface active agent is a water-soluble anionic, cationic, or non-ionic surfactant, said coating being at least about 0.1 micron in thickness, and said contact angle being less than 5°.

3. A polymerization reaction vessel of claim 1 wherein said copolymer contains about 50 mole percent of residues equivalent to olefinically unsaturated dicarboxylic acids and about 50 mole percent of residues equivalent to at least one copolymerizable vinylidene comonomer having at least one terminal $>CH_2$ group, the coating material contains sufficient surfactant so that there is less than about 1° contact angle for the coating solution in contact with the reactor surface, said coating is dried and is at least 0.1 to 10 microns in thickness.

4. A polymerization reaction vessel of claim 1 wherein said copolymer contains greater than about 25 mole percent of residues equivalent to olefinically unsaturated monocarboxylic acids and less than about 75 mole percent of residues equivalent to at least one copolymerizable vinylidene comonomer having at least one terminal $>CH_2$ group, the coating material contains sufficient surfactant so that there is less than about 1° contact angle for the coating solution in contact with the reactor surface, said coating is dried and is at least 0.1 to 10 microns in thickness.

5. A polymerization reaction vessel of claim 4 wherein said copolymer contains about 35 to about 65 mole percent of residues equivalent to acrylic acid and about 65 to about 35 mole percent of residues equivalent to at least one copolymerizable vinylidene comonomer containing one terminal $CH_2=C<$ group, having a molecular weight of about 3,000 to about 1,000,000, and said salt is an ammonium or metal salt.

6. A polymerization reaction vessel of claim 3 wherein said copolymer contains about 50 mole percent of residues equivalent to maleic acid and about 50 mole percent of residues equivalent to at least one copolymerizable monoolefinic vinylidene comonomer having one terminal $CH_2=C<$ group, and said salt is an ammonium or metal salt.

7. A polymerization reaction vessel of claim 5 wherein, in the copolymer, the copolymerizable vinylidene comonomer is an alkyl acrylate wherein the alkyl groups contain 1 to 4 carbon atoms.

8. A polymerization reaction vessel of claim 4 wherein said copolymer contains about 35 to about 65 mole percent of residues equivalent to methacrylic acid and about 65 to about 35 mole percent of residues equivalent to at least one copolymerizable vinylidene comonomer containing one terminal $CH_2=C<$ group, and having a molecular weight of about 3,000 to about 1,000,000 and said salt is a metal salt.

9. A polymerization reaction vessel of claim 6 wherein said vinylidene comonomer is an alkyl vinyl ether wherein the alkyl groups contain 1 to 4 carbon atoms.

10. A polymerization reaction vessel of claim 7 wherein the alkyl group is ethyl.

11. A polymerization reaction vessel of claim 9 wherein the alkyl group is methyl.

12. A method for reducing polymer build-up on the internal surfaces of a polymerization vessel exposed to polymerization reaction mixtures comprising applying on said internal surfaces of the polymerization vessel exposed to contact with the polymerization reaction mixtures, prior to adding the polymerization reaction mixture to the polymerization vessel, a coating material comprising an anionic, water-soluble carboxyl polymer salt and surface active agent, said salt being an ammonium, amine or metal salt, said copolymer being greater than 10 to 100% salt, said surface active agent being a water-soluble anionic, cationic or non-ionic surfactant present in amount sufficient to provide a contact angle of less than 30°, adding said reaction mixture to the thus coated polymerization vessel and effecting polymerization thereof in the presence of said water-soluble coating material.

13. A method of claim 12 wherein the polymerization reaction mixture is an aqueous mixture and said copolymer contains about 30 to about 80 mole percent of residues equivalent to olefinically unsaturated monocarboxylic acids and about 70 to about 20 mole percent of residues equivalent to at least one copolymerizable vinylidene comonomer having at least one terminal $>CH_2$ group, the coating material contains sufficient surfactant so that there was less than about 1° contact angle for the coating solution in contact with the reactor surface, and drying the coating, said coating being at least about 0.1 micron in thickness.

14. A method of claim 12 wherein the polymerization reaction mixture is an aqueous mixture and said copolymers contain about 50 mole percent of residues equivalent to olefinically unsaturated dicarboxylic acids and about 50 mole percent of residues equivalent to at least one copolymerizable vinylidene comonomer having at least one terminal $>CH_2$ group, the coating material contains sufficient surfactant so that there was less than about 1° contact angle for the coating solution in contact with the reactor surface, said dry coating being at least about 0.1 micron in thickness.

15. A method of claim 13 wherein the polymerization reaction mixture is an aqueous mixture and said copolymer contains about 35 to about 65 mole percent of residues equivalent to acrylic acid and about 65 to about 35 mole percent of residues equivalent to at least one copolymerizable vinylidene comonomer containing one terminal $CH_2=C<$ group, having a molecular weight of about 3,000 to about 1,000,000 and said salt is an ammonium or metal salt.

16. A method of claim 14 wherein the polymerization reaction mixture is an aqueous mixture and said copolymer contains about 50 mole percent of residues equivalent to maleic acid and about 50 mole percent of residues equivalent to at least one copolymerizable monoolefinic vinylidene comonomer having one terminal $CH_2=C<$ group and said salt is an ammonium or metal salt.

17. A method of claim 15 wherein the polymerization reaction mixture is an aqueous mixture and in the copolymer, the copolymerizable vinylidene comonomer is an alkyl acrylate wherein the alkyl groups contain 1 to 4 carbon atoms.

18. A method of claim 4 wherein the polymerization reaction mixture is an aqueous mixture and said copolymer contains about 35 to about 65 mole percent of residues equivalent to methacrylic acid and about 65 to about 35 mole percent of residues equivalent to at least one copolymerizable vinylidene comonomer containing one terminal $CH_2=C<$ group, and having a molecular weight of about 3,000 to about 1,000,000.

19. A method of claim 16 wherein said vinylidene comonomer is an alkyl vinyl ether wherein the alkyl group contains 1 to 4 carbon atoms.

20. A method for polymerizing vinyl chloride, optionally with other vinylidene comonomers copolymerizable therewith, in a polymerization vessel in an aqueous media, in the presence of a free radical forming catalyst, comprising, before adding the polymerization materials to the polymerization vessel, coating the internal surfaces of the polymerization vessel exposed to the polymerization materials during the polymerization reaction with a coating material comprising an anionic, water-soluble carboxyl copolymer ammonium, amine or metal salt, said copolymer being greater than 10 to 100% salt, salt and a water-soluble surface active agent present in amount sufficient to provide a contact angle less than 30°, adding said polymerization materials to the thus coated polymerization vessel and effecting polymerization of vinyl chloride, optionally with said other vinylidene comonomers, in the presence of said water-soluble coating material.

21. A method of claim 20 wherein said copolymer contains about 30 to about 80 mole percent of residues equivalent to olefinically unsaturated monocarboxylic acids and about 70 to about 20 mole percent of residues equivalent to at least one copolymerizable vinylidene comonomer having at least one terminal $>CH_2$ group, the coating material contains sufficient surfactant so that there was less than about 1° contact angle for the coating solution in contact with the reactor surface, said salts are ammonium amine or alkali metal salts, said surface active agent is a water-soluble anionic, cationic, or non-ionic surfactant, drying the coating, said coating being at least about 0.1 to about 10 microns in thickness.

22. A method of claim 21 wherein said copolymer contains about 50 mole percent of residues equivalent to olefinically unsaturated dicarboxylic acids and about 50 mole percent of residues equivalent to at least one copolymerizable vinylidene comonomer having at least one terminal $>CH_2$ group.

23. A method of claim 21 wherein said copolymer contains about 35 to about 65 mole percent of residues equivalent to acrylic acid and about 65 to about 35 mole percent of residues equivalent to at least one copolymerizable vinylidene comonomer containing one terminal $CH_2=C<$ group, having a molecular weight of about 3,000 to about 1,000,000 and said salt is ammonium or metal salt.

24. A method of claim 22 wherein said copolymer contains about 50 mole percent of residues equivalent to maleic acid and about 50 mole percent of residues equivalent to at least one copolymerizable monoolefinic vinylidene comonomer having one terminal $CH_2=C<$ group and said salt is a metal salt.

25. A method of claim 23 wherein, in the copolymer, the copolymerizable vinylidene comonomer is an alkyl acrylate wherein the alkyl groups contain 1 to 4 carbon atoms.

26. A method of claim 24 wherein said vinylidene comonomer is an alkyl vinyl ether wherein the alkyl groups contain 1 to 4 carbon atoms.

27. A method of claim 20 wherein the polymerization is a suspension polymerization.

28. A method of claim 20 wherein the polymerization is an emulsion polymerization.

29. A method of claim 20 wherein the coating material is applied to the surfaces of the polymerization vessel from a solution and applied in amount to provide a coating of at least about 0.1 micron thickness.

* * * * *